July 3, 1923.
F. M. PETERS ET AL
FLAT ICING MACHINE
Filed July 1, 1920 13 sheets-sheet 3
1,460,825
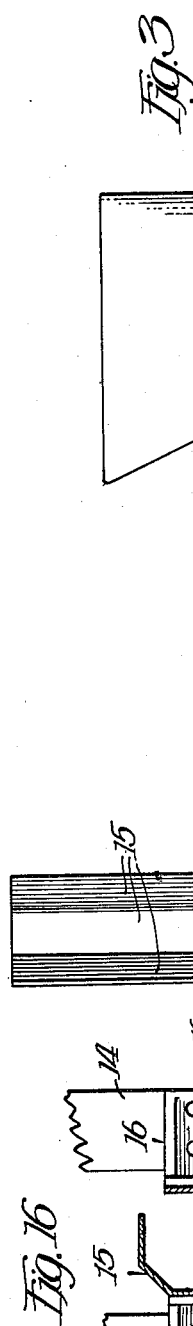
Fig. 3
Fig. 16
Inventors:
Frank M. Peters,
Warren H. Hungerford
By Fisher, Fowle, Clapp & Soans
attys.

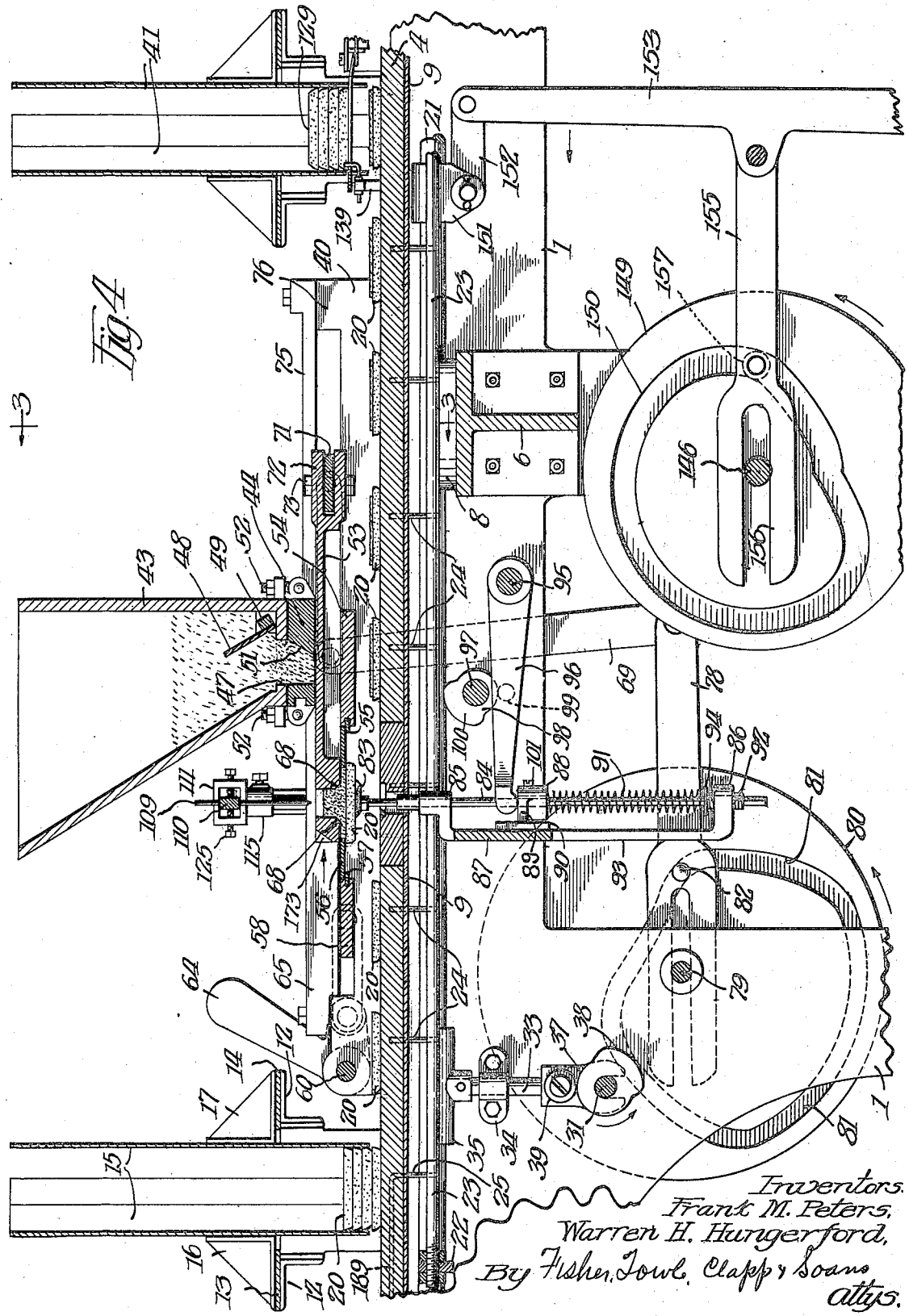

July 3, 1923.

F. M. PETERS ET AL

FLAT ICING MACHINE

Filed July 1, 1920    13 sheets-sheet 5

1,460,825

Fig. 5

Inventors:
Frank M. Peters,
Warren H. Hungerford,
By Fisher, Fowle, Clapp & Soans
Attys.

July 3, 1923.

F. M. PETERS ET AL

FLAT ICING MACHINE

Filed July 1, 1920 13 sheets-sheet 6

1,460,825

Inventors
Frank M. Peters,
Warren H. Hungerford,
By Fisher, Fowle, Clapp & Soans.
Attys.

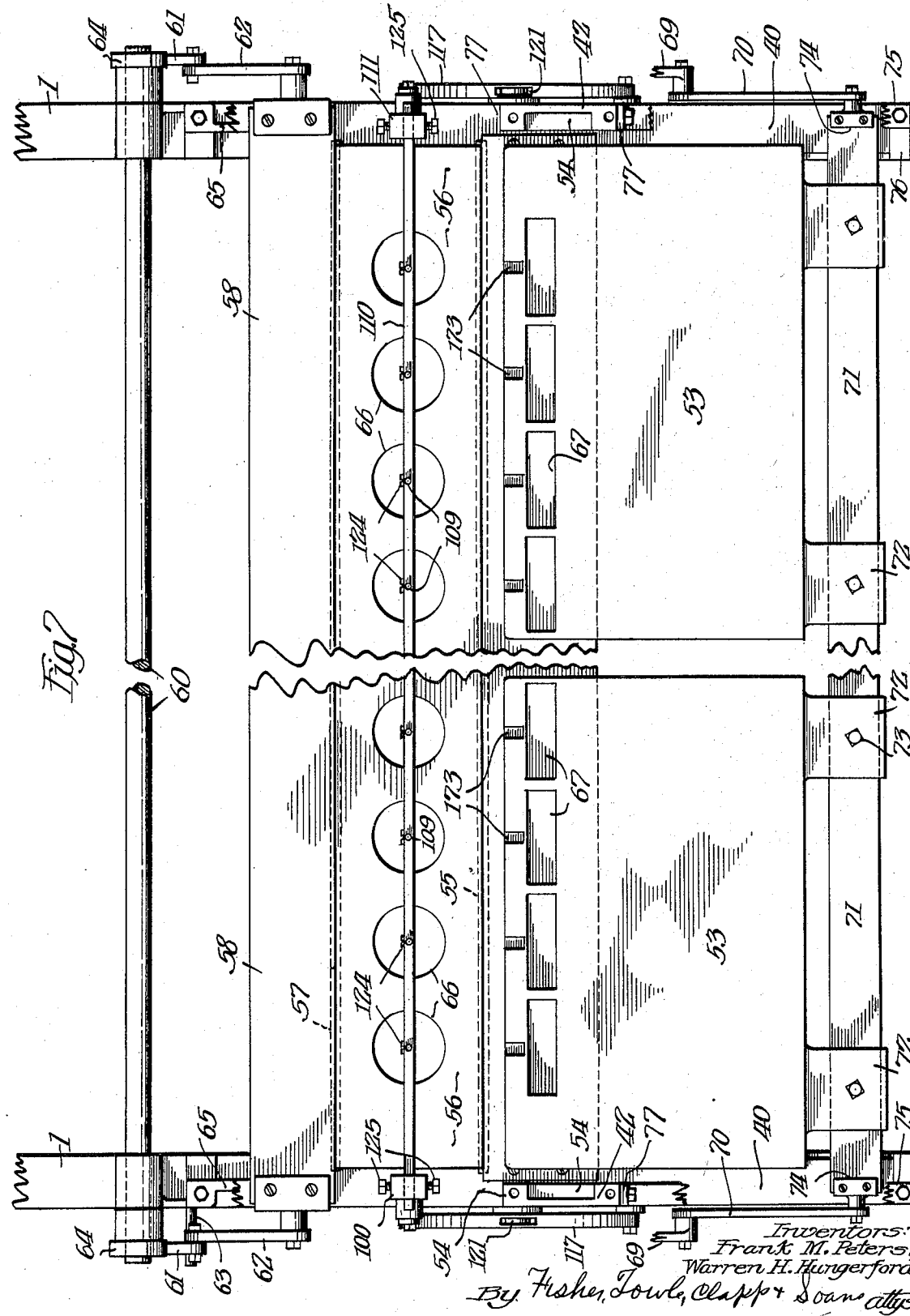

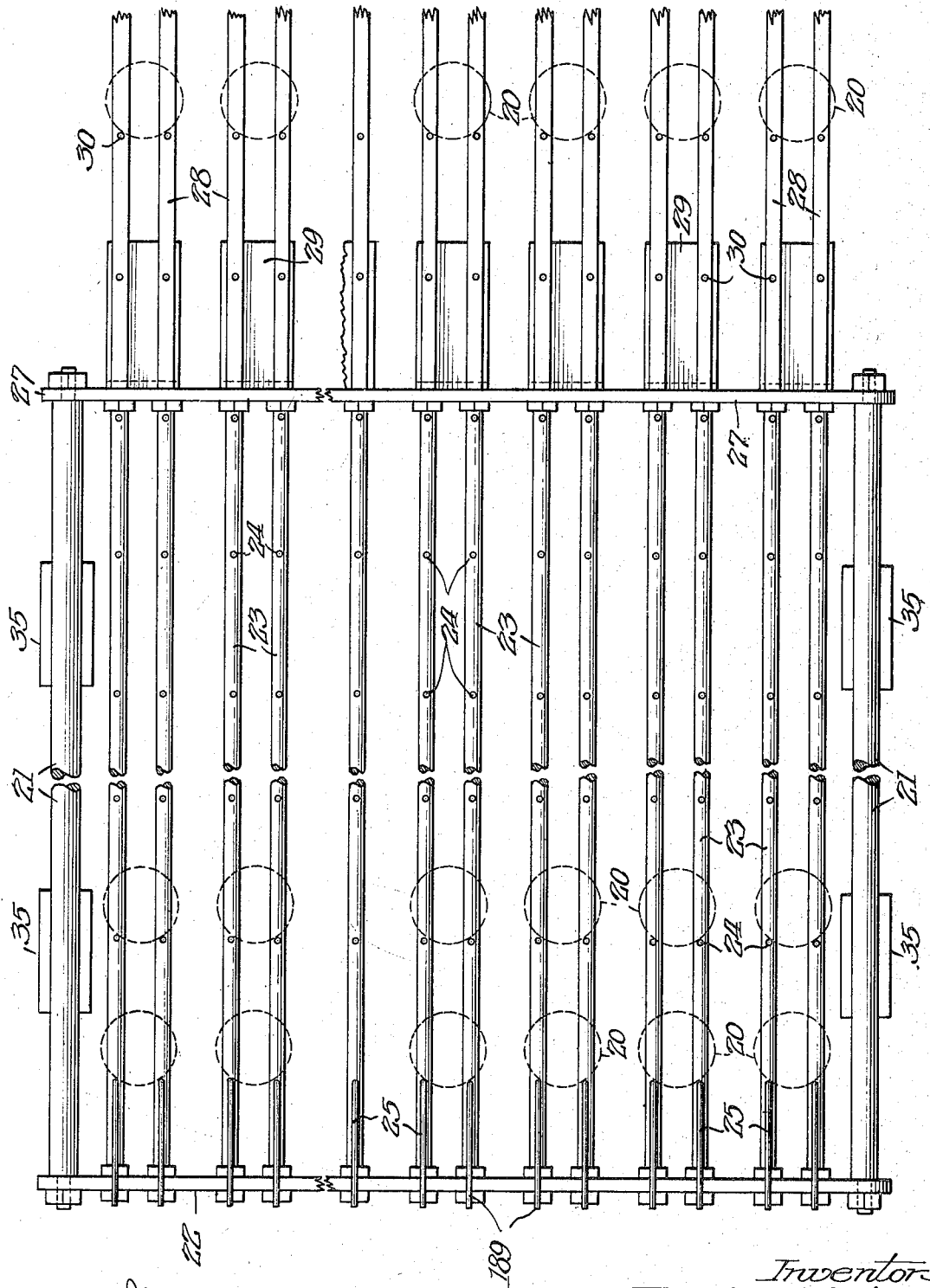

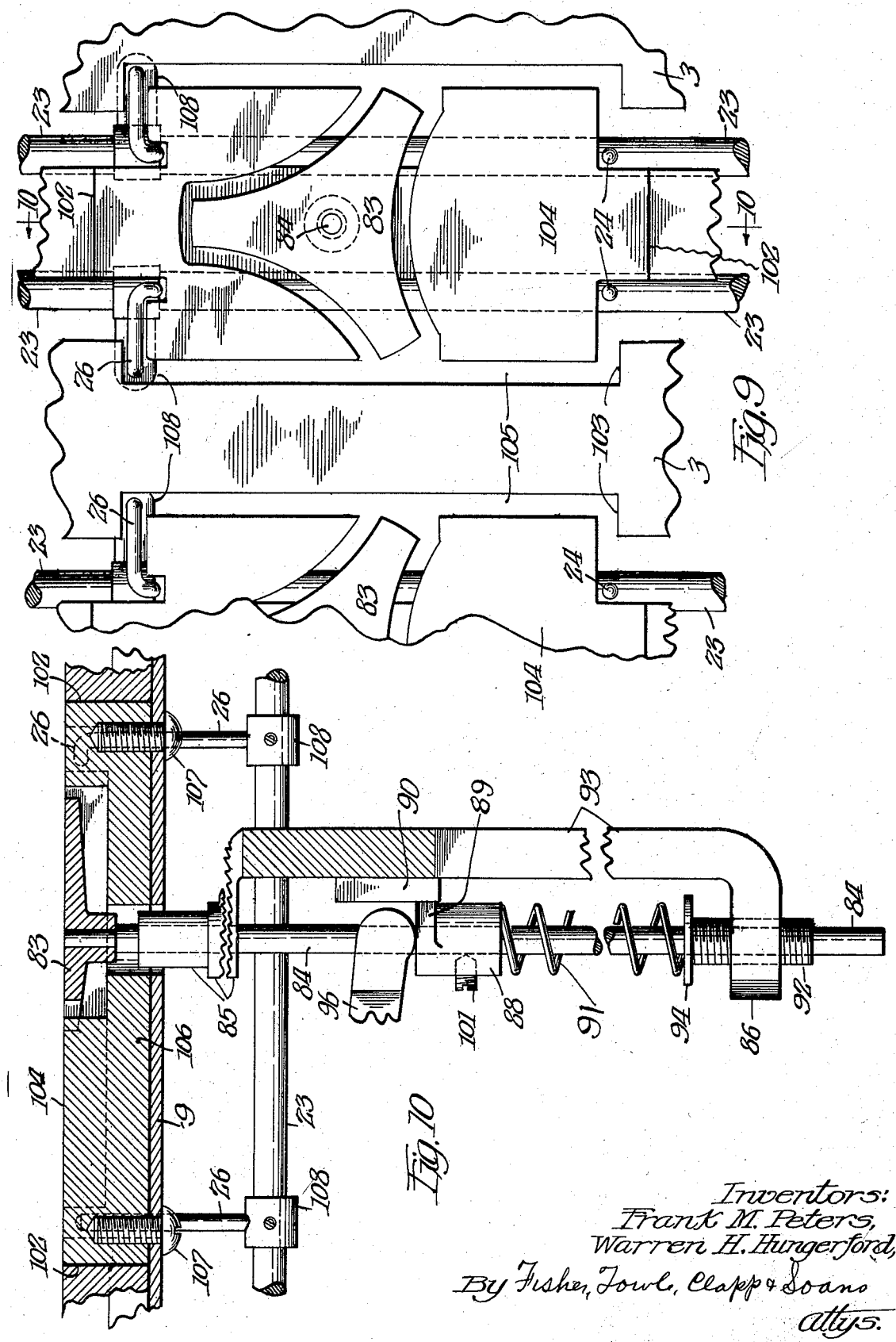

July 3, 1923.

F. M. PETERS ET AL

FLAT ICING MACHINE

Filed July 1, 1920   13 sheets-sheet 10

1,460,825

Inventors:
Frank M. Peters,
Warren H. Hungerford,
By Fisher, Towl, Clapp & Soans.
Attys.

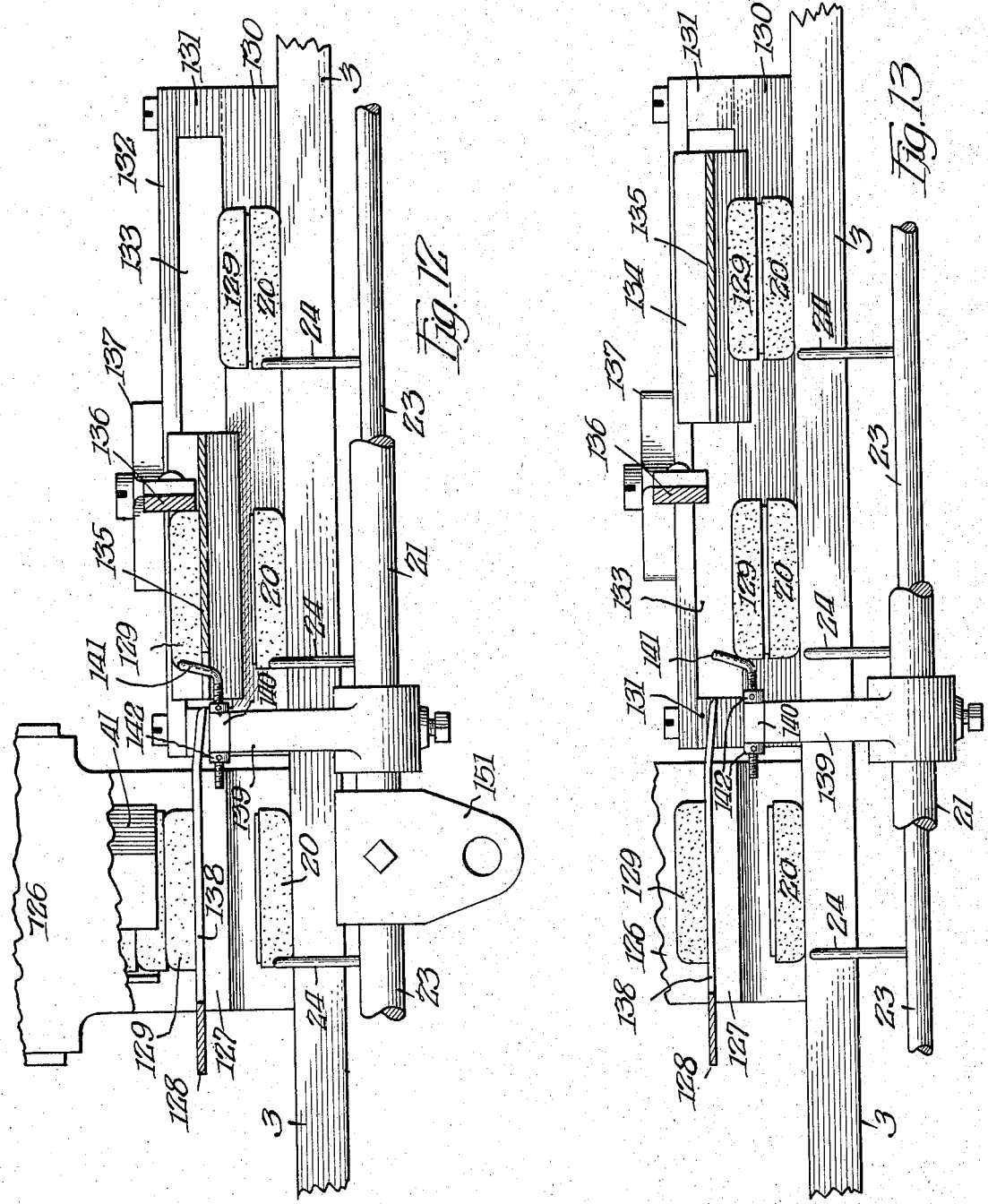

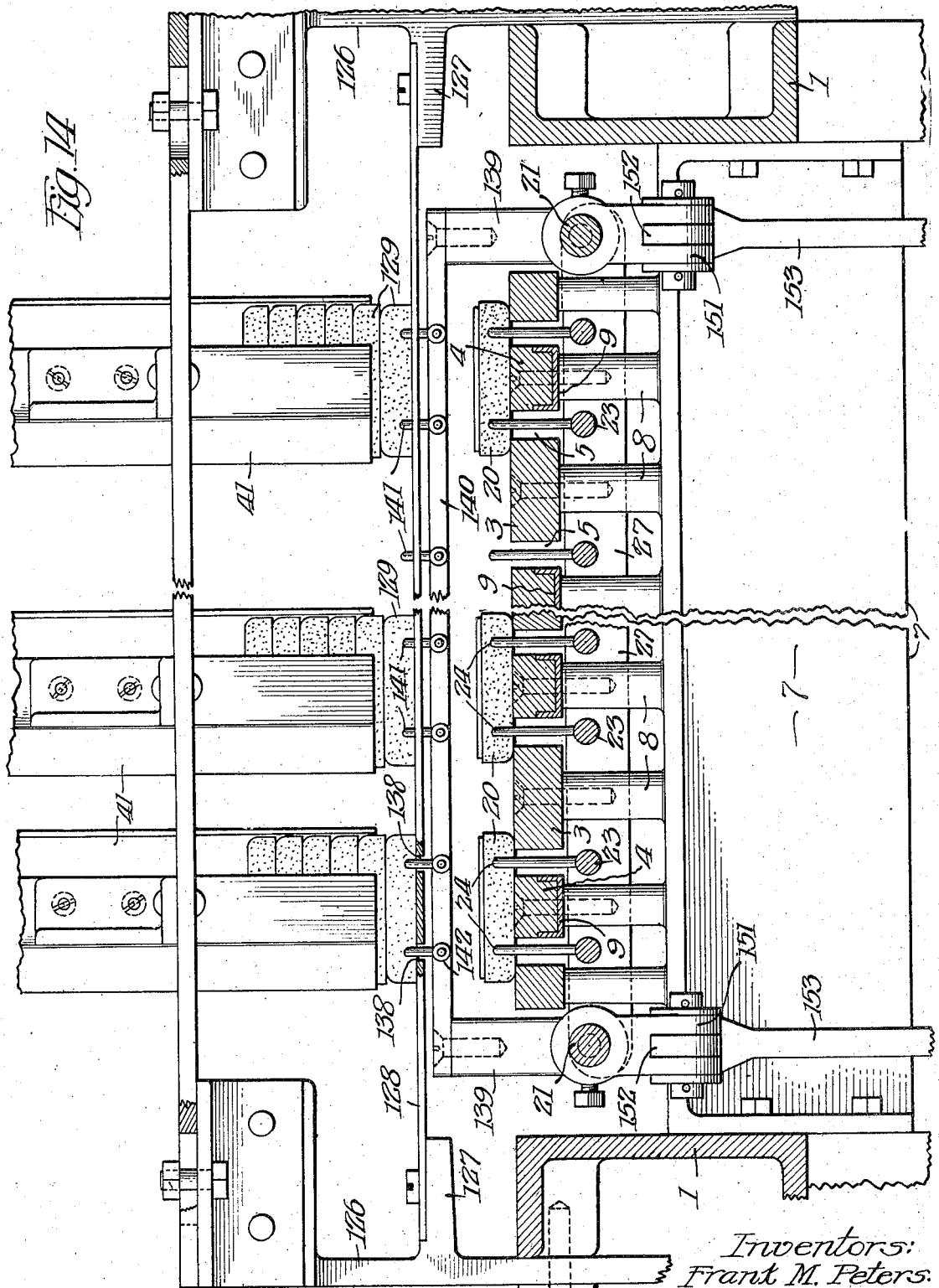

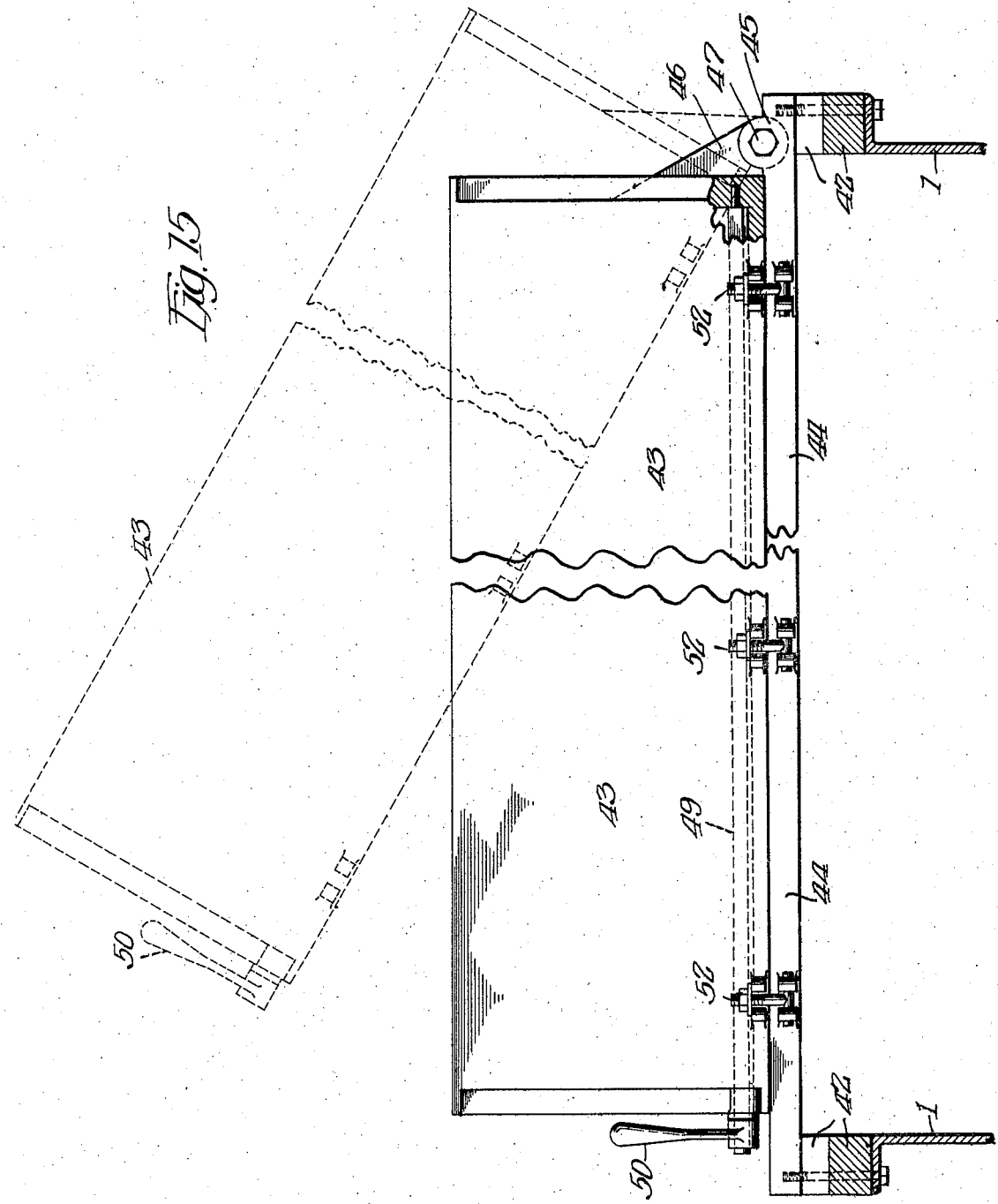

Patented July 3, 1923.

1,460,825

UNITED STATES PATENT OFFICE.

FRANK M. PETERS AND WARREN H. HUNGERFORD, OF CHICAGO, ILLINOIS, ASSIGNORS TO PETERS MACHINERY COMPANY, OF CHICAGO, ILLINOIS, A CORPORATION OF ILLINOIS.

FLAT-ICING MACHINE.

Application filed July 1, 1920. Serial No. 393,364.

*To all whom it may concern:*

Be it known that we, FRANK M. PETERS and WARREN H. HUNGERFORD, both citizens of the United States, residing at Chicago, in the county of Cook and State of Illinois, have invented certain new and useful Improvements in Flat-Icing Machines, of which the following is a specification.

Our invention has reference more particularly to a machine for applying a coating of frosting, icing or filling to the surface of cakes, cookies and the like, wherein the cakes or cookies are constantly fed from a magazine or other suitable source of supply and the coating automatically applied to the cakes or cookies as they are passed through the machine.

The principal objects of our invention are to provide an improved machine which will automatically apply a coating of icing or similar material uniformly to cakes or cookies; to provide such a machine with adjustments whereby it may be readily adapted to frost or ice cakes or cookies of various sizes and shapes; to effect uniform and complete distribution of the coating on the surface of the cakes; to provide improved mechanism for automatically feeding the cakes or cookies to the coating mechanism from a supply in a magazine; to interpose a filling between superposed cakes or cookies; and in general, to provide an improved machine of this character which will apply a coating of frosting or icing to cakes or cookies in a satisfactory manner and enable large quantities of cakes or cookies to be rapidly and conveniently coated or arranged in superposed relation, if desired, with the coating serving as a filling therebetween.

Figure 1:
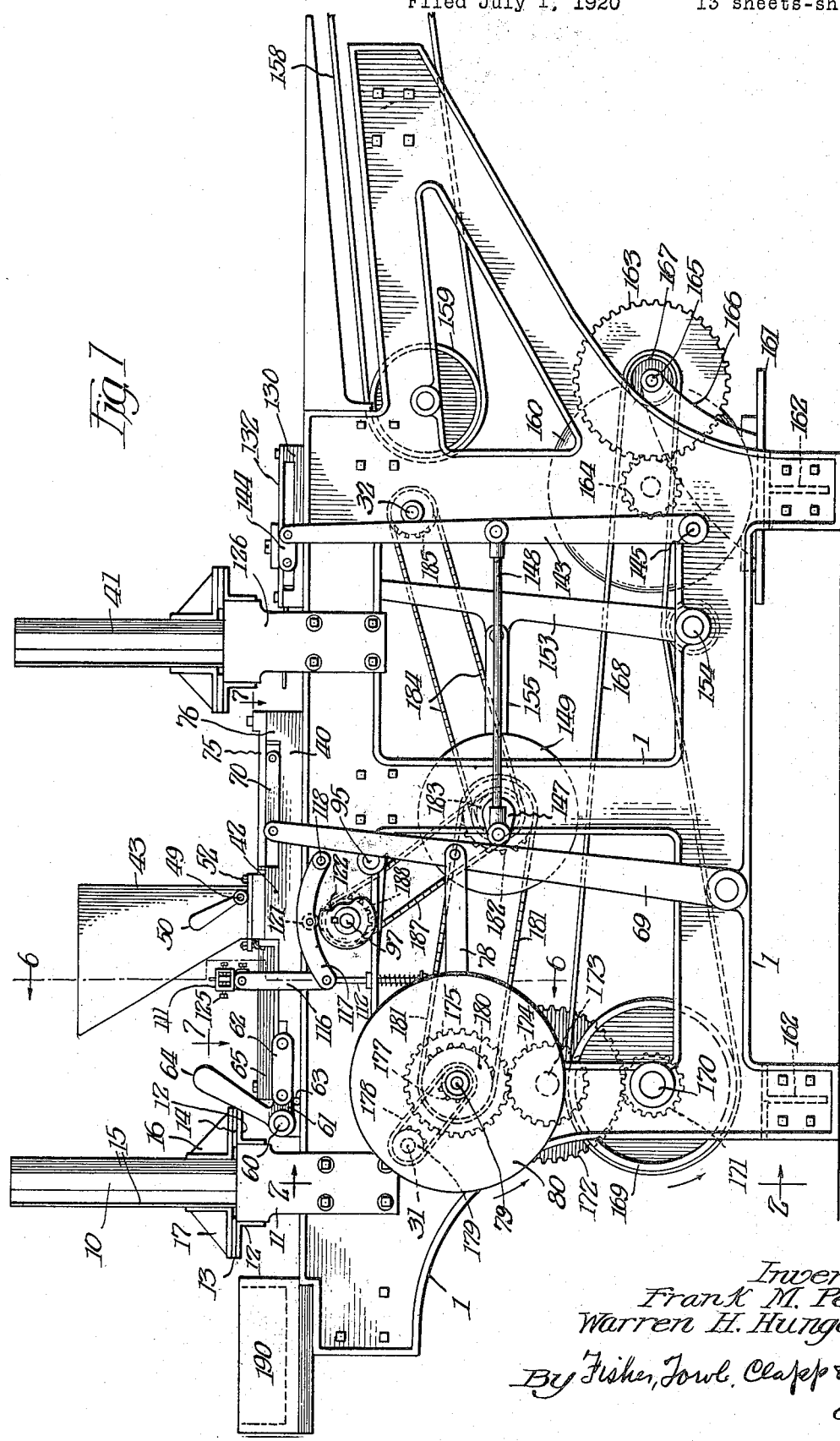
Figure 2:
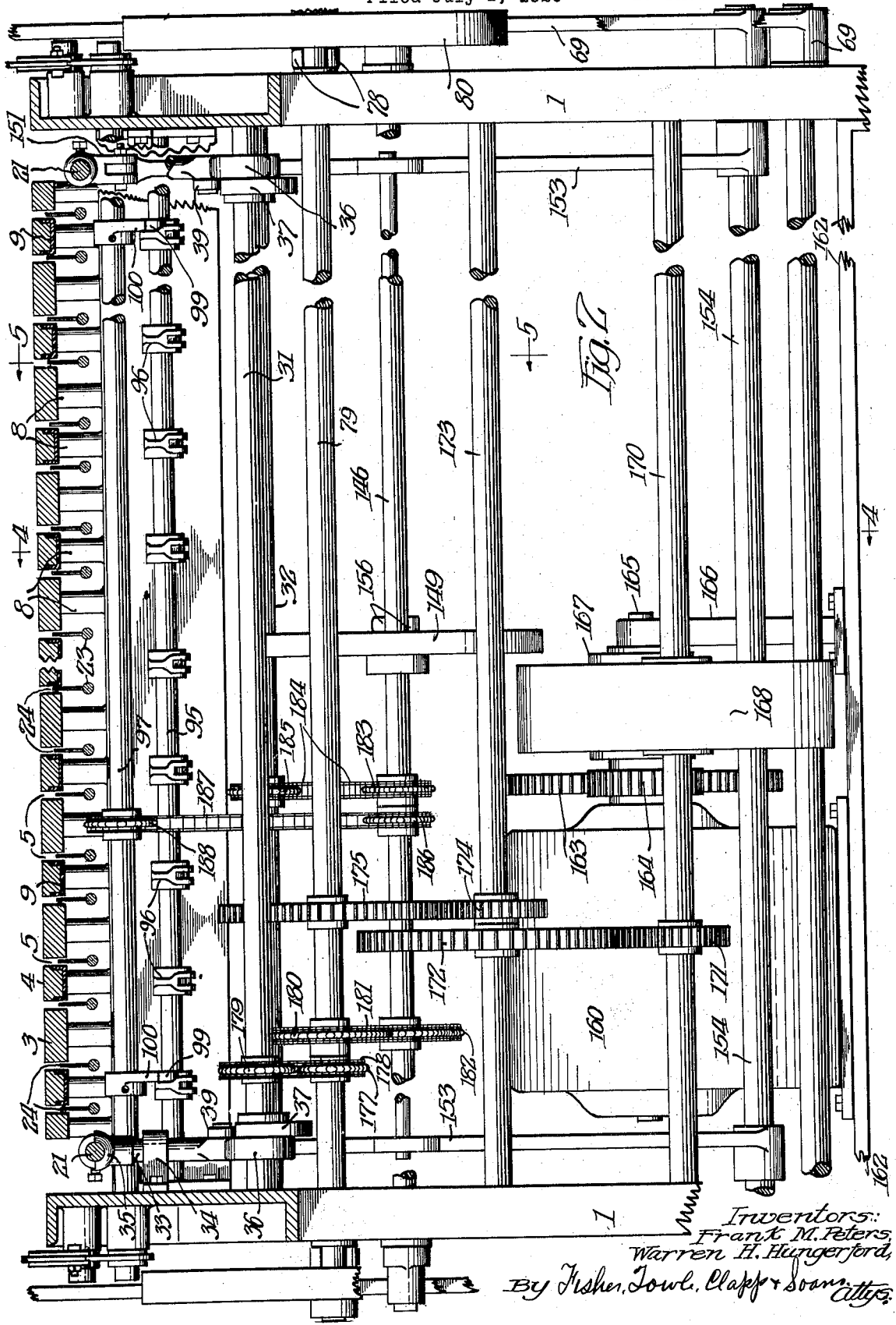
Figure 6:
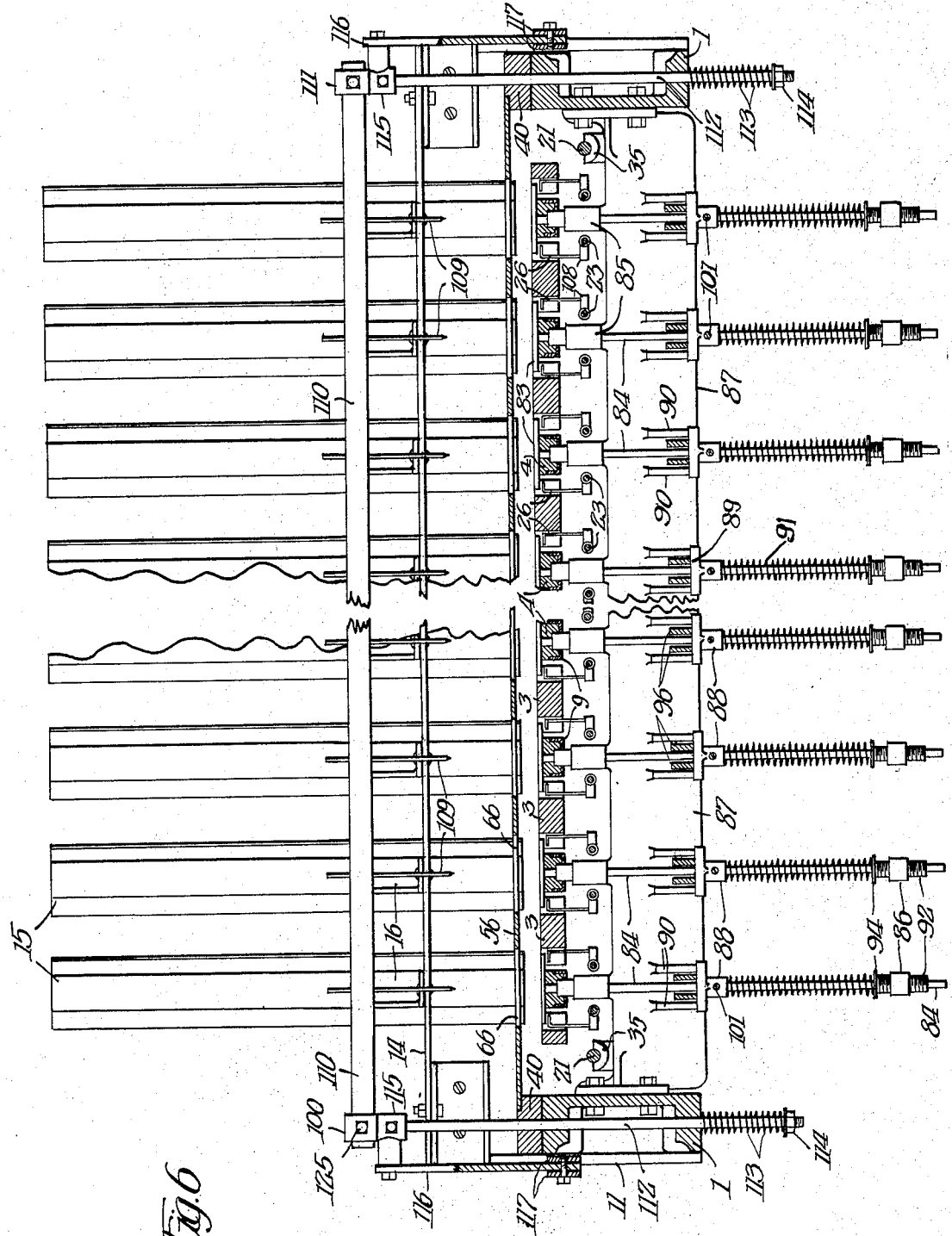
Figure 11:
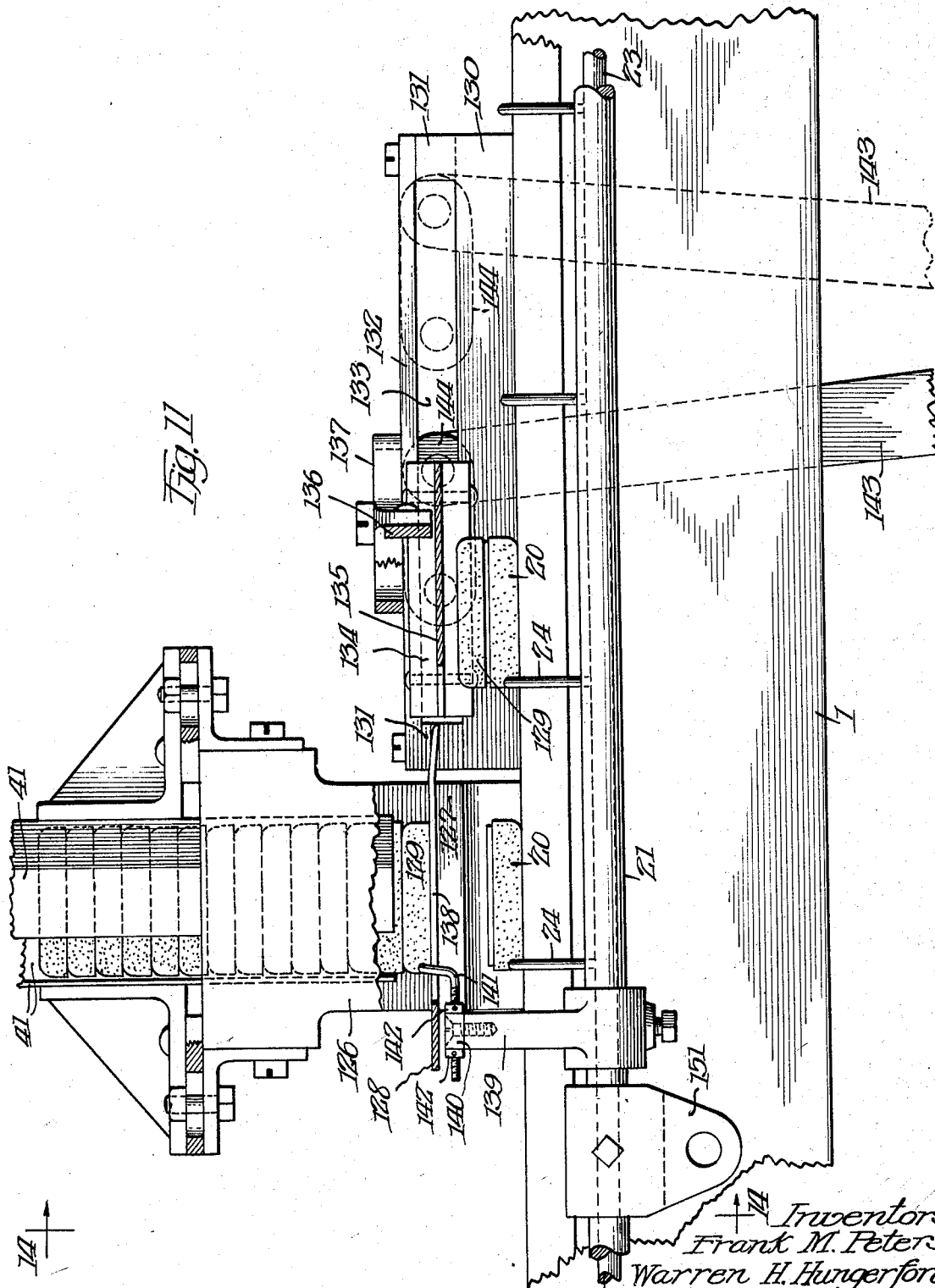

On the drawings, Figure 1 is a side view of an icing machine embodying our improvements; Figure 2 an enlarged vertical sectional view of the machine on the line 2—2 of Figure 1; Figure 3 an enlarged side view of the icing magazine and the preceding cake magazine with parts broken away and in section to disclose details of the construction; Figure 4 an enlarged fragmentary sectional view on the line 4—4 of Figure 2; Figure 5 a similar sectional view on the line 5—5 of Figure 2; Figure 6 an enlarged transverse vertical sectional view on the lines 6—6 of Figure 1, illustrating particularly the mechanism for elevating the cakes to the position in which the icing is applied thereto; Figure 7 a top view of the icing mechanism, taken on the line 7—7, Figure 1, with the icing magazine removed; Figure 8 a top view of the finger frame whereby the cakes are advanced through the machine; Figure 9 an enlarged fragmentary view of the upper surface of the machine showing one of the cake lifters and adjoining parts; Figure 10 a sectional view on the line 10—10 of Figure 9; Figure 11 an enlarged sectional view of the magazine and mechanism for depositing the top cake or cooky onto a previously frosted cake or cooky; Figure 12 a detail view of the mechanism for applying the top cake after the latter has been moved from the magazine to the position of deposit; Figure 13 a similar view showing said mechanism immediately after the top cake has been deposited onto the frosted cake therebelow; Figure 14 a transverse sectional view of the line 14—14 of Figure 11; Figure 15 a detail view showing the manner of mounting the icing magazine on the top of the machine; and Figure 16 a sectional view of the cake magazine on the line 16—16 of Figure 3.

Referring to the drawings, the reference numerals 1 indicate the side frames of the machine which are similar but reversely arranged and secured together in the desired spaced relation by a plurality of cross connectors which are properly located to afford a rigid connection of the side frames 1 and also affords support for the various parts of the machine where required. One of these cross connectors is located at the front of the machine and is indicated at 2, and serves to support the forward ends of a plurality of wood strips 3 and 4, which extend from end to end of the machine and serve to constitute the top of the machine along which the cakes are moved. These strips are spaced apart from one another to afford longitudinal slots or passageways 5 through and along which fingers of a reciprocating frame project and operate for sliding the cakes along the supporting surface of the machine. Near the rear end of the machine and also at an intermediate point, are frame cross connectors 6 and 7, each of which is set down below the top of the machine and has short posts or pedestals 8 corresponding to the strips 3 and 4 and supporting said strips on the upper ends thereof, the purpose of this construction being to afford openings beneath each slot 5 in which the rods of the frame which carries the fingers for moving the cakes are located and operate.

This machine is designed to have a series of cakes moving through the machine simultaneously and may be made of the width desired to accommodate the number of cakes to be moved through the machine at the same time. The cakes move directly along and over the strips 4 and extend over the slots 5 at each side of the strip onto the adjoining strips 3, and the strips 4, because of their narrow width and the break in the length thereof, which will be hereinafter more particularly explained, are preferably mounted in channel irons 9.

At the forward end of the machine over each of the strips 4 is a magazine 10, the number of magazines depending upon the particular capacity of the machine, and these magazines are held with their lower ends elevated above the surface of the strips 3 and 4, a distance somewhat greater than the thickness of one of the cakes, so that the latter may be withdrawn one at a time from the lower end of each magazine. For supporting the magazines, a plate 11 is secured to and extends up above each side frame 1, and each has front and rear angle brackets 12, upon the upper flanges of which are secured cross bars 13 and 14 extending across the machine and arranged in spaced relation to accommodate the magazines therebetween. These magazines each comprise a pair of oppositely arranged upwardly extending trough shaped members 15, which may be of angular form as shown in Figure 16, and are arranged in opposed relation so as to serve as a substantial enclosure for a stack of cakes therein. One of the members 15 of each magazine is mounted by means of a bracket 16 on the cross bar 14, and the other member 15 by a similar bracket 17 on the cross bar 13, and the ends of the bars 13 and 14 have corresponding diagonal slots 18 and 19 whereby the bars are adjustably secured to the brackets 12, so that the distance between the bars may be regulated to enlarge or diminish the size of the magazines and at the same time maintain the proper relative position of the members 15 to embrace cakes of different sizes therebetween and discharge same in the proper position onto the strips therebelow.

For advancing the cakes, which we have indicated at 20, along the surface of the machine, a longitudinally reciprocal and vertical movable frame is carried directly below the strips 3 and 4 and provided with fingers which at the proper time project above the surface of the strips 3 and 4 and engage the edges of the cakes 20 for moving same through the machine. This frame comprises a pair of longitudinal side rods 21, the ends of which are secured to cross bars 22 and 27 and said bars are connected between the side rods 21 by the intermediate rods 23, one of which is located directly below each slot or passageway 5 of the machine top. Each rod 23 has corresponding pins 24, 25 and 26 projecting upwardly therefrom and operating through the slots 5 so as to move the cakes along the machine top.

The frame comprising the rods 21 and 23 and cross-bars 22 and 27 constitutes the main cake advancing-frame, which, however, is supplemented by a plurality of bars 28 which extend beyond the bar 27 in vertical alignment with the rods 23. These bars 28 are arranged in pairs, each pair of which embrace one of the narrow strips 4 of the machine top and each pair is mounted on a bracket 29, which latter is secured to the bar 27 and holds the bars 28 at a somewhat higher elevation than the rods 23, and each bar 28 is provided with cake engaging pins 30, which because of the higher elevation of the bar 28 are shorter than the pins 24, 25 and 26. Shafts 31 and 32 extend transversely of the machine adjacent the ends thereof, and are journaled in suitable bearings provided therefor in the side frames 1. Above the end of each shaft 31 and 32, immediately inside the respective frame 1, is a short upright shaft 33 which is mounted in a bracket 34, which latter is secured to the respective side frame 1 and provided with a vertical bearing in which the shaft 33 slides. Each of the shafts 33 has a half-bearing 35 on the upper end in which the side rod 21 of the main cake moving-frame is supported, and at the lower end of each shaft 33 is a yoke 36 which straddles the shaft 31, or 32, as the case may be. Cams 37 are secured on the shafts 31 and 32 adjacent each yoke 36 and provided with an elevating portion 38 along about one-fourth of the periphery, and each of the yokes 36 has a roller 39 resting on the periphery of the cam 37 and adapted when the elevating portion of the cam engages therewith to elevate the shafts 33 and their half-bearings 35 which support the main frame 22, 23, 27, and elevate the latter so that the pins 24, 25, 26 and 30 are projected a short distance above the upper surface of the strips 3 and 4 which constitute the top of the machine. When the rollers 39 are not engaged with the elevating portion 38 of the cams, the cake advancing-frame is depressed by gravity, and at such times the cake advancing-pins are maintained below the upper surface of the strips 3 and 4.

The shafts 31 and 32 operate simultaneously and at a corresponding rate of speed, and the cams 37 are arranged on the shafts 31 and 32 so that all the rollers 39 are engaged at the same time by the elevating portions 38 of the cams so as to effect a uniform elevation and depression of all parts of the cake-moving frame.

A side rail 40 is mounted at each side of the machine on the upper edge of each of the frames 1, said rails being correspondingly constructed and positioned, and extending between the first magazines 10 and the second magazines 41, and intermediate of their ends, each of the rails 40 has an elevated portion 42 which serves to support a hopper 43 at a slight elevation above the upper surface of the strips 3 and 4 of the taple-top. This hopper extends from side to side of the machine and rests upon the top of a cross-plate 44, the ends of which extend over the elevated portions 42 of the side bars 40 and are bolted directly thereto. The plate 44 is of sufficient thickness so as to prevent sagging thereof intermediate of the ends, and has hinge lugs 45 at one end, as shown in Figure 15, and the hopper 43 has corresponding hinge lugs 46 at one end, through which a pivot bolt 47 is engaged, so that the hopper may be swung up off of the cross-plate 44, when desired, for greater convenience in cleaning and washing out the hopper without the water used for washing running down onto the machine. This hopper 43 may be of any convenient form and is provided with a slot 47 in the bottom extending across the machine and controlled by a valve 48 carried by a shaft 49 which projects through the end walls of the hopper and has a handle 50 thereon outside one of the end walls of the hopper, whereby the valve 48 may be operated. The cross-plate 44 also has a slot indicated at 51, which corresponds to and registers with the slot 47 in the bottom of the hopper, said slot being preferably tapered by having one edge thereof beveled, as indicated in Figure 5, to afford an outlet at the bottom of narrower width than the entrance into the slot at the top.

It is necessary to clamp the bottom of the hopper 43 tight against the upper surface of the cross-plate 44, so as to avoid leakage of the material in the hopper, which material is usually of a semi-fluid consistency, and for this purpose a number of eye-bolts 52 are pivoted at intervals along the edges of the cross-plate 44 and adapted to swing between correspondingly spaced pairs of lugs along the lower edges of the hopper 43, so that the bolts may be readily engaged or disengaged therefrom and utilized to clamp the hopper down tight against the cross-plate 24.

Spaced a suitable distance below the cross-plate 44 to afford the required room therebetween for a plunger or sliding-plate 53, is a bottom plate 54 which extends from side to side of the machine and has the ends seated and secured in recesses in the side rails 40, so that the upper surface of the plate 54 is flush with the upper surface of the side rails 40. This bottom plate has a lip 55 extending along the forward edge to afford a support for the rear edge of a stencil plate 56, which likewise extends from side to side of the machine. The forward edge of the stencil plate 56 is supported on a corresponding lip 57 of an adjustable cross-bar 58, the ends of which extend over and engage in recesses 59 of the side rails 40, so that the upper surface of the adjustable bar 58 is in the same horizontal plane as the upper surface of the bottom plate 54. The stencil plate 56 is of thin material and the lips 55 and 57 which support this stencil plate are arranged at a proper distance below the upper surface of the plates 54 and 58, so that the stencil plate 56, when resting on the lips 55 and 57, is flush with and forms a continuation of the upper surface of the plates 54 and 58. The cross-plate 58 is slidable in the direction of its width to and from the front of the machine, so as to serve as a clamp for engaging and holding the stencil plate 56 in position, the purpose of such adjustment being to permit removal of the stencil plate and enable other stencil plates to be employed for frosting cakes and cookies of various sizes and shapes, thus giving the machine a wide range of utility. For adjusting the clamp plate 58 there is a shaft 60 extending across the machine and journaled in the forward ends of the side rails 40. This shaft has a short crank-arm 61 at each end, each of which is connected by a link 62 to the corresponding end of the cross-plate 58, so that when the crank-arms 61 are thrown down to the position shown in Figure 1, in which they engage a stop pin 63, each crank-arm 61 and its link 62 are in alignment, or slightly beyond the position of alignment, and the cross-plate 58 is projected to the extremity of its movement and thereby locks the stencil plate 56 in place. Either one or both of the cranks 61 may be formed with a handle 64 for operating the shaft 60 to adjust the clamp plate 58. The clamp plate 58 is held down in the depressions 59 by an overlying bar 65 at each side of the machine, the ends of which are bolted to the side rail 40 in any convenient manner.

The stencil plate 56 has a plurality of openings 66 therein, the number thereof corresponding to the number of rows of cakes which are adapted to be carried through the machine, and each opening in the stencil plate overlies the line of travel of a row of cakes. The stencil openings 66 are made to conform to the size and shape of the particular cakes which are to be coated, and it is for this reason that the stencil plate is made removable; that is, so that plates with different sizes or shapes of openings, as may be required, may be employed for frosting or coating the cakes of various sizes and shapes in the same machine. Also the thickness of the stencil plate determines the thickness of the coating to be applied to the cake, and the thickness may also be varied if desired.

For applying a frosting or coating to the cake through the stencil openings 66, the plunger or slide 53 is arranged to reciprocate longitudinally on the machine at proper intervals, so as to carry charges of frosting or other coating material from the magazine 43 to the stencil openings 66; and this slide or plunger has a plurality of openings 67 therethrough adjacent the forward edge and corresponding in number to the number of stencil openings 66 and adapted, when the plunger is in the rearmost position, to register with the outlet from the slot 51 of the cross-plate 44. These openings 67 are of suitable length (that is, the dimension thereof transversely of the machine) so that they will straddle or extend across the widest openings 66 which may be employed in the stencil plate, and are of suitable depth and width to contain sufficient coating material to insure thorough coating of a cake of the largest size, and the length of stroke of the plunger or slide 53 is sufficient to carry the openings 67 clear beyond the largest opening in the stencil plate, as indicated by the dotted lines in Figure 5. The bottom plate 54, clamp plate 58 and stencil 56 form a uniform surface over which the plunger or slide 53 operates, which surface is flush with the upper edges of the side bars 40 along which the ends of the plunger 53 slide, and these plates form a bottom closure for the openings 67, so that the latter afford pockets to receive material from the magazine 43 and transfer same to the openings through the stencil plate.

Assuming that a cake is held up against the stencil plate 56 directly under one of the openings 66 therein, it will be observed that as the plunger 53 moves forwardly, the charge of material in the opening 67 is permitted to flow and spread over the exposed upper surface of the cake, such deposit being facilitated by the beveled edges 68 at each side of the opening 67, which in both the forward and reverse movement of the slide 53 serve to force the contents of the opening 67 down onto the surface of the cake which is exposed through the stencil opening 66. The stencil openings 66 are preferably of the same form as the outline of the cake and of slightly smaller dimensions, so that the edges of the cake, when elevated, engage against the edges of the opening and result in a deposit of coating which does not completely cover the upper surface of the cake. This is not only a matter of convenience in the operation of the machine and insures complete closing of the stencil opening so as to avoid leakage of the coating material around the edges of the cake as the material is applied, but also prevents an excess of coating material which might otherwise run down the edges of the cake or be squeezed out from between the cakes when the top cake is applied to the upper surface of the coating.

For operating the plunger or slide 53, there is a lever 69 at each side of the machine, the lower ends of which are pivoted to the corresponding frame 1 near the bottom, and the upper ends of which are connected through links 70 with the ends of a cross-bar 71 which extends across the machine at the rear edge of the plunger 53 and is embraced by boxings 72 thereof, which are suitably apertured to receive the bar 71 therein. Set screws 73, threaded through the walls of boxings 72 serve to clamp the cross-bars 71 securely in place. For connecting the links 70 to the cross-bar 71, the latter is preferably provided with a pivot bracket 74 at each end, the vertical dimension of which is substantially the same as the thickness of the plunger or slide 53; and these brackets slide upon the upper surface of the side rails 40 and are held down thereagainst by straps 75, which at their rear ends are secured to an upward extension 76 at the rear of the side rail, and at the forward ends have a vertical flange 77 which is bolted to the rear edge of the cross-plate 44.

The levers 69 are swung on their pivots to effect the reciprocation of the plunger or slide 53 by links 78, the rear ends of which are pivoted to the lever 69 intermediate of the ends of the latter and the forward ends of which are divided so as to straddle a shaft 79 which extends from side to side of the machine and is journaled in the side frames 1, and provided at each end with a cam disc 80, having a groove 81 and an inner face which engages a roller 82 on the link 78, whereby a properly timed reciprocating-movement is imparted to the latter.

The cross-plates 54 and 58 and the stencil 56 are elevated above the upper surface of the strips 3 and 4 to afford ample space for cakes of any desired thickness to be moved thereunder along the strips 3 and 4, which movement is effected in a step by step manner by the fingers on the frame 22, 23, 27, which is so arranged that at the interval of rest in the step by step movement of the cakes, a series of cakes is brought to rest directly under the stencil openings 66, and when so positioned it is necessary to elevate the series of cakes to engage the stencil plate and close the openings 66 therethrough. For this purpose there is a lifter mounted concentric with and directly below each opening 66 and comprising a substantially triangular head 83, the upper surface of which is normally flush with the upper surface of the strips 3 and 4 and has a depending stem 84 which is journaled in upper and lower bearings 85 and 86, respectively, of a cross-plate 87 which extends from side to side of the machine at a distance below the strips 3 and 4 and has the ends secured to the side frames 1. Each stem 84 intermediate of the bearings 85 and 86 has a collar 88 fixed thereon and formed with a flange or shoulder 89 having a straight edge at one side which slides along a pair of ribs 90 on the cross-plate 87, which are suitably spaced to hold the collar 88 and the stem 84 connected therewith, and consequently the head 83 at the upper end of the stem, from turning in the bearings 85 and 86. A coil spring 91 is interposed between the collar 88 and the lower bearing 86 so as to have a constant tendency to elevate the stem 84 and the supporting-head 83. The lower bearing 86 preferably comprises a sleeve 92 which has a threaded engagement with the depending arm 93 of the cross-plate 87 and is formed with an annular flange 94 at the upper end, against which the lower end of the spring 91 is seated. The purpose of this construction is to afford an adjustment whereby the tension of the spring 91 may be regulated.

For controlling the elevation of the stems 84 and supporting heads 83, which the springs 91 tend to cause, there is a shaft 95 extending from side to side of the machine and journaled in the side frames 1 at a distance rearwardly from and parallel with the series of stems 84, and this shaft has a series of rocker arms 96 fixed thereon, corresponding in number to the stems 84, and each one of these rocker arms extends forwardly and has the forward end divided so as to straddle the corresponding stem 84 of the cake lifters and bear against the upper face of the collar 88 on the stem. A shaft 97 extends from side to side of the machine above the series of rocker arms 96, substantially midway between the front and rear ends thereof and is journaled in the side frames 1. This shaft has a cam 98 at each end adapted to engage a roller 99 on the corresponding end rocker arm 96, which cam, throughout the larger part of its periphery, is of proper diameter to permit the stems and supporting-heads 83 to be lifted by the tension of the springs 91 to the proper elevation to hold a cake resting on the head 83 against the undersurface of the stencil plate 56. These cams 98 each have an enlargement 100 which, at the proper time—that is, at the time when the cakes are advanced along the surface of the machine engage the rollers 99, thereby depressing the outer rocker arms 96 so as to rock the shaft 95 and thereby depress the intermediate rocker arms 96 so that all of the stems 84 are depressed and the cake-supporting heads 83 depressed to a position wherein the upper surfaces thereof are flush with the upper surface of the strips 3 and 4, thus permitting the cake which has just been elevated to be moved off of the head and advanced onward through the machine and another cake to be moved onto the head for elevation to the coating position. Obviously, if cakes of different thickness are frosted in this machine, the elevation of the heads 83 must be regulated in accordance with the thickness of the cake, and for this purpose the collars 88 are secured on the stems 84 by set screws 101, which enable the collars to be positioned on the stem so as to afford the proper elevation of the heads 83 and leave the required space for the cake between the upper surface of the head and the lower surface of the stencil plate 56.

It is desirable that the head 83 shall be of suitable dimensions to reach out close to the edge of the cake supported thereupon, so as to afford a substantial support for the cake, and the head is, therefore, necessarily wider than the strip 4 along which the cake is advanced through the machine, and it is, moreover, necessary to arrange the cake-advancing pins on the frame 22, 23, 27 at this point, so as to clear the large head and at the same time have the pins spaced sufficiently close together so as to properly engage the cake. To this end the wood strip 4 is cut away at a distance to the front and to the rear of the cake lifter 83, as indicated at 102 in Figures 9 and 10, and the strips 3 at each side of the strip 4 are cut away for a substantially corresponding distance at each side of the cake lifter, as indicated at 103 in Figure 9, so that a block 104 of substantially the same width as the lifter head may be interposed between the ends of the strip 4, where the latter is cut away. This block is of such width as to leave openings 105 between the lateral edges of the block and the adjoining strips 3, and has an opening cut in the upper surface corresponding to the shape of the lifter-head 83, so that the latter may be withdrawn sufficiently so that the upper surface thereof is flush with the upper surface of the block 104, the upper surface of which latter is flush with the strips 3 and 4. This block has a longitudinal rib 106 on the under-side which fits into the channel iron 9 and is held in place by screws 107, which are inserted through perforations in the channel iron 9 and inserted into the block 104, as shown in Figure 10.

Obviously, fingers on the frame 22, 23, 27, such as the straight fingers 24, cannot be employed at the point where the block 104 is located, and we have therefore provided outwardly extending brackets or arms 108 on the rods 23 at this point which have fingers 26 extended upwardly therefrom at their outer ends through the slots 105 and then bent inwardly, as indicated in Figure 9, so as to extend over the lateral portions of the black 104 and approach sufficiently close to one another so as to insure engagement with cakes of any size which may be desired to use in connection with this machine.

In order to insure release of the cakes from the stencil plate 56, in case they should tend to adhere thereto, we mount a releasing pin above and concentric with each opening 66 which is adapted to be depressed as the cake supporting head 83 is moved downwardly. These pins, which are indicated at 109, are carried by a cross-rod 110 which extends from side to side of the machine and has the ends engaged and secured in boxings 111 at the upper end of shafts or stems 112, each of which is mounted in an upright position in the corresponding side frame 1 for vertical operation to raise and lower the pins 109. On the lower end of each rod 112 is a spring 113, one end of which engages against the underside of the frame 1 and the other end of which bears against a nut 114 which is threaded on the lower end of the rod 112, so as to continually have a tendency to move the rod downwardly and thereby depress the cross-bar 110 and the pins carried thereby. Obviously, this pin-carrying frame is required to be held in the elevated position, except for the short period of time when the cake-supports 83 are lowered, and to effect the proper operation of the pins 109, the hub 115 of each boxing 111 has a lateral projection to which the upper end of a link 116 is pivoted, and there is a link or arm 117 at each side of the machine, pivotally mounted thereon, as indicated at 118, and having the forward end pivoted to the lower end of the corresponding link 116. The shaft 97, hereinbefore referred to, which extends from side to side of the machine and carries the cams 98 for operating the rocker arms 96 which control the operation of the cake-supports 83, also has a cam 120 adjacent each end which engages a roller 121 carried by the rocker arm 117 intermediate of its ends, the main portion of the periphery of such cam being formed so as to hold the rocker arms 117 and the pin-support bar 110 in the elevated position. This cam is cut away at one side, as indicated at 122, so as to permit the rocker arms 117 and the pin-supporting frame carried thereby to be depressed under the tension of the springs 113, said cut away portion being arranged with respect to the enlarged portion 100 of the cams 98, so that the depression of the pin-carrying frame immediately follows the depression of the cake-supports 83. The depression of the pins 109 occurs as the slide or plunger 53 is being withdrawn, and in order to afford clearance at the forward edge of the plunger for the pins as they begin to move downward, there is a series of notches 173 in the forward edge of the slide 53, one for each of the pins 109.

Each pin 109 is secured in place in the vertical aperture provided therefor in the bar 110, by means of a set screw 124, and the bar 110 is adjustable transversely of the machine, and also toward the front and rear thereof, so as to properly center the pins with respect to the stencil plate openings 66, such adjustment being effected by the opposed set screws 125, which are threaded into the end walls of the boxing 111.

After the cakes from the magazine 10 have been coated with the icing or frosting, it is oftentimes desirable to apply another cake on the coated surface to provide an article of confectionery in a sandwich form, and to accomplish this result, there are a series of magazines 41 beyond the coating mechanism, which magazines are adjustable in size and constructed and mounted in the same manner as the magazines 10, except that the side-supporting brackets 126 for these magazines project above the top of the machine somewhat further than the brackets 11, so that the magazines 41 are held with the lower ends thereof at a higher elevation than the lower ends of the magazine 10, for the reasons which will hereafter appear.

Each bracket 126 is provided on its inner face with a rib or flange 127 which supports a plate 128 which extends from side to side of the machine directly under the magazines 41, so as to support stacks of the upper cakes or cookies 129 in the magazines, said plate being spaced a sufficient distance below the lower ends of the magazines 41 to enable the cakes 129 to be withdrawn laterally, one at a time, from the lower end of the magazine. This plate 128 is also held at a sufficient elevation above the upper surface of the strips 3 and 4, which form the top of the machine, so as to provide ample clearance for the coated cakes 20 as they are moved along the upper surface of the machine.

Directly at the rear of the series of magazines 41 and at each side of the machine is a slide-way composed of the rail 130 with elevated ends 131 and with a top plate 132 secured to the elevated ends to provide a slot 133 in which a block 134 is mounted to slide, and there is a plate 135 extending from side to side of the machine and having the ends thereof secured to the blocks 134. This plate is normally held in the forward position along the rear edge of the plate 128, so as to have the cakes 129 moved thereon from the plate 128, the rear edge of which latter may be bent downwardly, as indicated in Figure 11, if desired, to facilitate the discharge of the cakes onto the upper surface of the plate 135. This plate 135 is adapted to be withdrawn rearwardly from the normal position during the period of time that the cakes 20 are at rest, and the machine is designed so that there will be a series of coated cakes 20 located directly below the position of the cakes 129 on the plate 135, so that when the latter is withdrawn the cakes 129 fall by gravity down onto the coated surface of the cakes therebelow, as shown in Figure 13. Obviously, the cakes 129 on the plate 135 must be held against movement with the plate 135 when the latter is withdrawn, and for this purpose, a bar 136 extends from side to side of the machine immediately above and adjacent the rear edge of the plate 135 when the latter is in the normal forward position, and this bar serves as an abutment which holds the cakes on the plate 135 from movement when the latter is withdrawn and enables said plate to be slid out from underneath the series of cakes thereon. The bar 136 is connected at each end to a bracket 137, which is adjustably secured in any suitable manner to the respective strap 132 of the guides for the plate 135, said adjustment being desired to position the abutment bar 136 at a greater or less distance from the magazines 41 so as to position cakes of different sizes at the proper position above the lower cakes 20.

For feeding the cakes from the magazines 41 under the plate 135, the plate 128 is provided with a pair of slots 138 directly under each magazine 41 and spaced apart a less distance than the diameter of the cakes which it is proposed to use in the magazines, said slots being extended from the rear edge of the plate 128 to the front edge of the magazine and leaving, of course, sufficient stock therebeyond, so that the plate 128 maintains its rigidity. The plate may, of course, if desired, be reinforced along the forward edge. A post 139 is mounted on each of the side-rods 21 of the cake-advancing frame, and there is a cross-bar 140 secured to the upper ends of the posts 139 and extending from side to side of the machine immediately below the plate 128. This bar is provided with a series of pins 141 corresponding with the slots 138 of the plate 128 and having the forward ends upturned, as indicated in Figure 11, so as to project up through the slots 108 sufficiently to engage the lowermost cake 129 in the magazine 41 and slide same rearwardly from its position at the bottom of the stack of cakes to the required position on the upper surface of the plate 135. These pins 141 are preferably arranged for adjustment longitudinally of the machine, as shown, for example, in Figure 11, by threading the stem of the pin and securing same in openings which extend through the bar 140 in the direction of the length of the machine and regulating the adjustment of the pin by clamp nuts 142.

The plate 135 is withdrawn from the normal forward position immediately after the cakes 129 have been moved thereon and while the coated cakes 20 are at rest on the surface of the machine, and to effect this movement, there is a lever 143 at each side of the machine which has the upper end connected by a link 144 to the corresponding end block 134 of the plate 135, and the lower ends of the levers 142, which extend down to a point near the base of the machine, are pivoted to the side-frames 1, as indicated at 145. A shaft 146 extends from side to side of the machine and has the ends journaled in the side frames 1, and there is a crank 147 on each end of the shaft 146 and at the outside of the respective frames 1, which cranks are connected by the pitman 148 with the levers 143 intermediate of the ends of the latter.

This shaft 146 also has a cam disc 149 fixed thereon adjacent each end immediately inside the respective frame 1 and provided with a groove 150 in the face thereof of the proper contour to impart the required longitudinal movement to the cake-moving frame 22, 23, 27, and at the proper time. Each of the side rods 21 of the cake-moving frame has a collar 151 thereon with depending lugs, between which the forward end of a link 152 is pivoted, and each of the links 152 has the rear end pivoted to the upper end of rocker arm 153 which extends downwardly and has the lower end pivoted at 154 to the respective side-frame 1. A rod 155 is pivoted to each rocker arm 153 intermediate of the ends of the latter, and has the forward end forked to provide a long slot 156 which engages the shaft 146. There is a roller 157 on each rod 155 which is engaged in the groove 150 of the respective cam disc 149, so that upon rotation of the shaft 146, the rocker arms 153 are caused to operate in unison and effect the required reciprocating movement of the cake-advancing frame.

At the rear end of the machine the strips 3 and 4 are preferably extended some distance beyond the magazines 41, and the extension bars 28 are provided on the main cake-advancing frame 22, 23, 27 to continue the advance of the completed cakes to the extreme rear end of the machine. A belt 158 extending from side to side of the machine and passing around a roller 159 has the upward length thereof arranged at an inclination somewhat as shown in Figure 1, and passing out from under the rear extremity of the machine adjacent to the surface thereof over which the cakes are moved so that the latter, as they pass from the surface of the machine, fall onto the belt 158 and are carried thereby to whatever point may be desired.

For operating the various mechanisms of the machine, a motor 160 is mounted on a supporting plate 161 between the side frames 1 of the machine, said plate 161 being preferably secured to the top of one of the cross-girths 162 which connect the lower extremities of the side-frames 1. A back gearing is employed in connection with the motor and comprises a spur gear 163 meshing with the pinion 164 on the armature shaft of the motor and carried by the shaft 165 mounted in brackets 166 carried by the cross-girth 162. A small pulley 167 on the shaft 165 is connected by the belt 168 with a large pulley 169 at the forward end of the machine, which pulley is fixed on the shaft 170 which extends from side to side of the machine and is journaled in the side-frames 1 thereof. This shaft carries a pinion 171 meshing with a spur gear 172 on another cross-shaft 173, and this cross-shaft carries a pinion 174 meshing with a spur gear 175 on the cross-shaft 79, which latter carries a sprocket 177 connected by the chain 178 to a sprocket 179 of the same size on the shaft 31, hereinbefore described, the rotation of which controls the elevation of the forward end of the cake-advancing frame. The shaft 79 also has a sprocket 180 fixed thereon and connected by the chain 181 with a sprocket 182 of the same size on the shaft 146, which latter shaft carries the cams 149 for reciprocating the cake-advancing frame, and the cranks 147 for reciprocating the plate 135 controlling the drop of the upper cakes 129 onto the coated lower cakes 20.

The shaft 146 has a sprocket 183 fixed thereon and connected by the chain 184 with a sprocket 185 of the same size on the shaft 32, hereinbefore referred to, which carries the cams for controlling the elevation of the rear portion of the cake-advancing frame, and there is also a sprocket 186 on the shaft 146 connected by the chain 187 to a sprocket 188 of the same size on the shaft 97, which carries the cams for operating the cake supporting-heads 83 and the cake releasing-pins 109.

It will be noted that by reason of the chain drives having the same size of driving and driven sprockets throughout, that the shafts 31, 32, 79, 97 and 146 all rotate at the same rate of speed, and the relation of the cams and cranks is such that the reciprocation of the slide or plunger 53, the elevation and depression of the cake-carrying heads 83, the depression and elevation of the releasing pins 109, withdrawal and return of the cake-supporting frame 35, all take place during the time that the cakes remain at rest on the supporting surface, during which time the cake-advancing frame 22, 23, 27 is lowered by the operation of the cams 37 and moved forwardly of the machine preparatory to the next movement thereof for advancing the cakes along the machine. The cake-supporting heads 83 are first elevated and held momentarily against the stencil plate 56 while the plunger or slide 53 is moved forwardly over the stencil plate and is partly withdrawn, whereupon the cake-carrying heads 83 are forced downwardly and at the same time the releasing pins 109 are projected downwardly to disengage any cakes which adhere to the stencil plate 56. At the same time that the operations just indicated are taking place, the plate 135, which has previously had a series of cakes deposited thereon, is moved rearwardly to permit the series of cakes 129 to drop down on a corresponding series of previously coated cakes 20, which were moved to the position under the plate 135 at the same time that the series of cakes 129 was moved onto the plate 135. After the operations just indicated are completed, the cake-advancing frame 22, 23, 27 is elevated by the cams 37 and moved rearwardly of the machine in the elevated position by the cam discs 149, after which the operations above indicated are repeated.

In order to hold the stack of cakes in the magazine 10 in horizontal position and avoid tilting or angular displacement of the stacks of cakes during the time that the lowermost cake is being withdrawn, we prefer to form the pins 25 with forwardly extending horizontal portions 189 which form a horizontal support for the stack of remaining cakes in the magazine 10, and as the frame is depressed, allow the stack of cakes to lower onto the surface of the strips 3 and 4. At the front of the machine a receptacle 190 may be provided, if desired, to hold a quantity of cakes to be fed into the magazines 10 and 41.

It will be observed that we have provided a machine which is not limited to any particular size or shape of cakes, but is universal in use, as the magazines may be readily adjusted to accommodate cakes of various sizes and moreover the machine may be used otherwise than hereinbefore described as for example, to merely coat the upper surface of a cake, this being accomplished by omitting cakes from the magazines 41 and passing the cakes from the magazines 15 through the machine without depositing a top cake on the surface thereof after they are coated. The stencil plate also may be readily changed to apply coatings to different sizes or shapes of cakes, and to vary the thickness of the coating, the plunger or slide is arranged to afford a sufficient quantity of coating for as large a surface as it may be desired to coat and apply the coating thoroughly and uniformly over the entire exposed surface.

While we have shown and described our invention in a certain particular form, we are aware that various changes and modifications may be made without departing from the principles of our invention, the scope of which is to be determined by the appended claims.

We claim as our invention:

1. In a cake machine, the combination of a frame having a supporting surface along which cakes are adapted to be moved, means adjacent the supporting surface for coating the surface of the cakes with a material, a magazine adapted to contain a supply of cakes, and a plurality of vertically movable pushers, adapted to reciprocate lengthwise of the supporting surface for withdrawing cakes from the magazine and advancing same to the coating means.

2. In a cake machine, the combination of a frame having a supporting surface with openings therethrough, a cake magazine, means above the supporting surface for applying a coating of material to the surface of the cakes, a frame provided with upwardly extending projections, means for elevating and lowering the latter frame so as to cause the projections to periodically project above the supporting surface through the openings therein, and means for reciprocating said latter frame lengthwise of the supporting surface so as to feed the cakes from the magazine along the supporting surface to the coating means.

3. In a cake machine, the combination of a frame having a supporting surface composed of a plurality of slats spaced apart to afford slots therebetween, a cake magazine at one end of the supporting surface, a reciprocal frame with pushers adapted to be projected through the slots between the slats, above the surface of the latter, for withdrawing cakes from the magazine and moving same, step by step, along the supporting surface, a hopper for material to be applied to the surface of the cakes, and means for successively coating the cakes withdrawn from the magazine with the material contained in the hopper.

4. In a cake machine, the combination of a conveyor, a series of magazines arranged transversely of the conveyor and adapted to supply cakes thereto, each of said magazines comprising upright parts adjustable relatively to and from one another so as to enlarge and diminish the size of the magazine, and means whereby adjustment of one magazine effects a corresponding adjustment of all the magazines of the series.

5. In a cake machine the combination of a conveyor, a magazine for supplying cakes to the conveyor, said magazine comprising front and rear walls and side walls and means for simultaneously adjusting two of said walls diagonally of the direction of movement of the conveyor so as to simultaneously and correspondingly vary the distance between the side walls and the front and rear walls of the magazine.

6. In a cake machine, the combination of means for moving cakes through the machine, a removable stencil plate extending across the machine and clamped edgewise between a pair of supports, one of which is adjustable for holding the stencil plate in position, said stencil plate being provided with openings therethrough, means for applying the cakes as they are moved through the machine to the openings in the stencil plate, and mechanism for applying a coating material to the surface of the cake through the opening in the stencil plate.

7. In a cake machine, the combination of a stencil plate having openings therethrough, a means for applying cakes to the openings, a hopper for coating material spaced from the openings and a member slidable under the bottom of the hopper and over the stencil plate and provided with apertures adapted to receive a quantity of coating material from the hopper and apply same through the openings in the stencil plate to the surface of the cakes.

8. In a cake machine, the combination of a stencil plate having an opening therethrough, means for applying a cake to the opening, a hopper for coating material and a member adapted to be projected from and returned under the hopper while the cake is applied to said opening, said member having opposed inclined surfaces, adapted to spread the coating material in both directions of its reciprocation over the surface of each cake.

9. In a cake machine, a combination of mechanism for moving a plurality of rows of cakes through the machine, a stencil plate extending transversely of the machine and having an opening corresponding with each row of cakes, a hopper extending transversely of the machine and pivoted thereon to swing to one side of the machine, and a plunger interposed between the bottom of the hopper and the stencil plate for applying a coating of material from the hopper through the openings of the stencil plate simultaneously, to a cake in each row.

FRANK M. PETERS.
WARREN H. HUNGERFORD.